United States Patent Office 3,320,297
Patented May 16, 1967

3,320,297
PROCESS FOR PREPARING POLYSILOXANE
MIXTURES
Manuel A. Pino, Oakland, Calif., assignor to Chevron Research Company, a corporation of Delaware
No Drawing. Filed Jan. 30, 1963, Ser. No. 255,077
4 Claims. (Cl. 260—448.8)

The present invention relates to the production of polysiloxane mixtures which are eminently suitable for use in hydraulic base fluids and synthetic lubricants. In particular, it relates to a novel process for producing such mixtures in such a way that they would contain a large proportion of polyalkoxysiloxanes found to display excellent viscosity-temperature relationship and good hydrolytic stability.

Several techniques for producing polysiloxane mixtures for use in hydraulic base fluids and the like have been proposed in the past.

One such technique consisted in reacting silicon tetrachloride with an alcohol to produce a trialkoxychlorosilane and then reacting this latter with water in the presence of an acid acceptor, such as pyridine. This created the necessity for separating the resulting solid hydrochloride salt, and, furthermore, was accompanied by a loss of the product due to its occlusion on the solid salt. Washing the solid salt off did not provide a perfect solution of the problem, because this caused emulsification.

Another method effectively produces polysiloxane mixtures by reacting an aliphatic alcohol (alkanol) with a silicon tetrahalide in a first process stage to obtain a mixture of alkoxyhalosilanes. The resulting halogen acid is removed, and the mixture of halosilanes is then reacted with water in a second stage in the presence of picoline and yields a reaction product mixture of polyalkoxypolysiloxanes and picoline hydrochloride, whereupon these two products are separated. The application of this effective method is predicated on the availability of picoline acceptor.

The present invention provides a new and improved process for producing valuable mixtures of polysiloxanes by reacting together in one single reaction step a silicon tetrahalide, an alkanol from the group of primary and secondary alcohols containing from 1 to 16 carbon atoms, water, and a tetraalkyl orthosilicate, the alkyl substituents of which correspond to the alkyl portion of the alkanol.

The application of tetraalkyl orthosilicate in substantial proportions in this reaction is found to be critical and permits moderating the process so as to influence in a desired direction the distribution of the several components in the final polysiloxane reaction product mixture. It dispenses with the need for additional processing agents, such as "acid acceptors." The prior art so far has failed to recognize the benefits of reacting substantial proportions of orthosilicate with silicon tetrahalides, alkanols and water in the preparation of polysiloxane mixtures.

The orthosilicate "moderator," whose alkyl portion should correspond to that of the alkanol reactant, may be either supplied from the preceding process cycle or yet supplied from a source extraneous to the process. When thus introduced into the reaction zone, the orthosilicate moderates the reaction so as to contribute to the formation of polyalkoxypolysiloxane mixtures meeting the particular specifications of the industry or the Government, as the case may be.

An important advantage resulting from the use of this co-reactant orthosilicate moderator in the preparation of predominantly disiloxane product mixtures is that at the termination of the process the final product mixture contains less orthosilicate than one did originally start with at the beginning of the process. By the same token, in the preparation of predominantly polysiloxane mixtures containing a preponderance of higher polysiloxanes over disiloxanes, the application of orthosilicate as a reaction moderator likewise prevents excessive formation and accumulation of orthosilicate as a by-product in the final product mixture. Thus, whether one strives to obtain a predominantly disiloxane or a predominantly polysiloxane product mixture, the burdensome task of separating from the ultimate product mixture the by-product orthosilicate and finding for it a suitable outlet (use or purchaser) is either greatly minimized or completely eliminated.

The reaction according to the process of the invention requires the use of a $C_1$–$C_{16}$ alkanol in amount which may range from about 2.0 to not more than about 3.3 mols, and preferably from about 2.5 to about 3.0 mols per each mol of the tetrahalide. Water is introduced into the reaction in an amount which may vary from about 10 to about 25 mol percent, based on the total quantity of alkanol and water, while the concentration of orthosilicate in the reaction system throughout the process is maintained in a ratio from about 1:10 to about 10:1, referred to the final volume of the reaction product mixture, when a predominantly disiloxane base stock is desired. Preferably, in this case, the orthosilicate is made available in amounts corresponding to a ratio of from about 1:1 to about 2:1. When predominantly polysiloxane base stocks are prepared, the concentration of the orthosilicate reaction moderator in the system is maintained in a ratio which may range from 1:1 to about 1:20, referred to the final volume of the reaction product mixture.

The alkanol may be either a primary or a secondary alcohol containing from 1 to 16 carbon atoms, and preferably from 4 to 10 carbon atoms. It may be either a straight-chain or a branched-chain alkanol. Mixtures of such alkanols may be also employed in the reaction. Examples of operative alkanols are: methanol, ethanol, 2-ethylbutanol, isobutanol, n-hexanol, 2-ethylhexanol, secondary butanol, n-decanol, n-dodecanol, 3-nonanol, isopropanol, isodecanol, and the like.

The silicon tetrahalide may be either silicon tetrachloride, silicon tetrabromide or silicon tetraiodide. Because of its commercial availability silicon tetrachloride is at present preferred.

The orthosilicate can be a tetraalkyl silicate of the type which would be formed in the reaction of a silicon tetrahalide with an alkanol in accordance with the following equation:

$$SiX_4 + 4ROH \rightarrow Si(OR)_4 + 4HX$$

Examples of such silicates which must, of course, in all instances correspond to the particular alkanol being used in order to furnish product mixtures conforming to the specifications are the following: tetra-2-ethylbutyl orthosilicate; tetra-n-hexyl orthosilicate; tetra-2-ethylhexyl orthosilicate; tetranonyl orthosilicate; tetradodecyl orthosilicate, and the like.

Among the various operative alkanols 2-ethylbutanol is presently preferred, because it gives a product of good hydrolytic stability, good viscosity and satisfactory volatility under the various specifications of the industry and the Armed Forces. When using higher water-insoluble alcohols, such as $C_{10}$–$C_{16}$ alkanols, to produce polysiloxane mixtures in accordance with the invention, addition of a mutual solvent for the alkanol and water, for instance, dioxane, will be helpful. This mutual solvent will be easily recoverable from the crude reaction product mixture by distillation and can then be re-used.

The several reactants required for the process are preferably introduced simultaneously into the reaction zone which contains the orthosilicate, as this is found to give satisfactory ratios of disiloxane to polysiloxane in the reaction product. Where the siloxanes (di- and higher ones) are 2-ethylbutoxysiloxanes derived from 2-ethylbutanol, this ratio to satisfy the specifications should be not less than 1.5:1 for mixtures characterized by a predominance of disiloxanes over higher polysiloxanes. In those product mixtures formed by reacting 2-ethylbutanol with a silicon tetrahalide and water, where the poly-(2-ethylbutoxy)-polysiloxanes predominate over hexa-(2-ethylbutoxy)-disiloxanes, this ratio should lie between 1:2 and 1:3 in order to satisfy the specifications of the industry and the Government for corresponding hydraulic fluids and lubricants.

The viscosity of the aforementioned poly-(2-ethylbutoxy) polysiloxane is another property which may be used in lieu of the aforementioned volume ratios of disiloxane to polysiloxane in order to characterize a particular product mixture. Thus when the aforesaid volume ratio is 1:2.2, the corresponding polysiloxane product mixture would have a viscosity as low as 340–360 centistokes at −20° F. On the other hand, in product mixtures with the volume ratio of disiloxane to polysiloxane being 1.5:1, the minimum viscosity may be 3.4 centistokes at 210° F., while the maximum viscosity may be about 800 centistokes at −65° F. The viscosity is an important criterion which serves as a basis for the purchases of polysiloxane base stocks by the industry and the Government.

One may also add first the orthosilicate into the reaction zone, following this by the addition of silicon tetrahalide and then one will introduce the alkanol and water. Likewise one may add the orthosilicate into the reaction zone, follow this by simultaneous addition of the alkanol and water (wet alkanol), and, finally, add the silicon tetrahalide. It is also possible, and under some circumstances preferred, to introduce the alkanol and water into the reaction zone, to add silicon tetrahalide to the orthosilicate in a separate zone, and then to introduce this last mixture into the aqueous (wet) alkanol in the reaction zone.

As mentioned before, water is employed in amounts which may range from about 10 to about 25 mol percent, based on the total quantity of alkanol and water to be reacted with silicon tetrahalide, particularly satisfactory results being obtainable with water in amounts from about 14 to about 20 mol percent in producing polysiloxane mixtures where a predominance of disiloxanes is desired. When using, for instance, 2-ethylbutanol, the blend of this alkanol and water, in stoichiometric proportions will contain 14.4 mol percent of water and, reacted with a silicon tetrahalide, such as $SiCl_4$, and a corresponding tetraalkyl (2-ethylbutyl) orthosilicate, will assure an acceptable disiloxane to polysiloxane ratio in the reaction product mixture. Under certain conditions, and if so desired, less than 10 mol percent and as low as 5 mol percent of water may be employed, although in this case excessive formation of orthosilicate may take place. When mixtures of predominantly polyalkoxypolysiloxanes are being sought, the proportion of water required for the reaction may range from 18 to 25 mol percent, based on the total quantity of the alkanol and water.

An adequate quantity of alkanol and water to react with all the halogen of the tetrahalide should be employed at all times. If not enough of the two is added, the reaction will not go to completion and some reactive halosilicon compounds will remain in the product which will then display corrosive tendency and will lack stability. Neutralization will then be required and this adds costs. If more than about 25% of water is used, it is apt to react with silicon tetrahalide in preference to the alkanol, and an excess of this latter will build up in the reaction product mixture concurrently with an increased formation of polysiloxanes other than disiloxanes; in other words the ratio of disiloxane to polysiloxane in the product will be lower, which may make this product unacceptable for a particular industrial use.

The reaction temperatures are preferably held in the range from about 70 to about 105° F. If desired, under particular climatic conditions, lower temperatures may be employed. This results in correspondingly lower disiloxane-polysiloxane volume ratios in the product. On the other hand, when higher temperatures are employed (above 105° F.), it may be necessary to use pressure equipment or to resort to the use of a reflux condenser to collect and recycle the silicon tetrahalide which would be distilling overhead. The temperatures of the reactor are maintained within the preferred range from about 70 to about 105° F. by a suitable control of the rates of addition of the reactants and/or by cooling, whenever necessary and preferred. In using the pressure equipment provision should be made for the bleeding of the gas, such as HCl, so as to avoid a dangerous build-up of pressure.

The crude polysiloxane product mixture is purged of the gas, such as HCl, by blowing with an inert gas, such as nitrogen. One may also neutralize the product with a basic material, such as amine, ammonia, sodium bicarbonate, and the like. However, this alternative (use of a base) may cause a shift in the final, otherwise expected product distribution (shift in the disiloxane to polysiloxane ratio), owing to the formation of the water of neutralization. This water would then react with the orthosilicate, producing disiloxane, and with the disiloxane, producing polysiloxane, so as to change the specified disiloxane-polysiloxane ratio in an undesirable direction. Therefore, blowing with an inert gas is preferred, whenever feasible.

The time is not a critical feature of the process of this invention. Generally, a 30-gallon batch of disiloxane-polysiloxane product may be prepared in from 2 to, at most, 12 hours.

As mentioned before, I contemplate reacting silicon tetrahalide, a $C_1$–$C_{16}$ alkanol, water and a corresponding tetra-alkyl orthosilicate from any source under conditions which would assure production of polysiloxane mixtures characterized by a desirable, acceptable volume ratio of hexa-alkoxydisiloxane to higher polyalkoxypolysiloxanes of 1.5:1, when predominantly disiloxane mixtures are to be produced. To do this the orthosilicate co-reactant must be present in a sufficient concentration in the reactor throughout the entire process, so as to moderate the reaction yield and to make possible the desired distribution of the particular components in the product.

I also contemplate production of predominantly polysiloxane mixtures. In this case, the concentration of the orthosilicate co-reactant necessary to assure an acceptable disiloxane/polysiloxane ratio of 1:2 to 1:2.5 should lie in the range of ratios from 1:1 to 1:20, referred to the final volume of the reaction product mixture.

In a more specific aspect of the invention, the aforementioned desirable mixtures of polysiloxanes are produced by reacting the silicon tetrahalide, preferably present as silicon tetrachloride, with a $C_1$–$C_{16}$ alkanol (for instance, 2-ethyl butanol), water, and an orthosilicate co-reactant, which is recycled, modifying the yield of polysiloxanes and minimizing the net orthosilicate content in the final product mixture.

The reaction is initiated by feeding first the necessary quantity of a corresponding orthosilicate from an extraneous source of supply into the reaction zone, and/or, by utilizing sufficient orthosilicate formed in the preceding batch of the reaction product as the necessary reaction moderator. Some alkanol, for instance, 2-ethyl butanol, may be combined with the orthosilicate, usually in an amount not exceeding 20–25% based on the weight of the orthosilicate moderator. Then the alkanol and silicon tetrachloride reactants are added into the reactor, the molar ratio of the alkanol to silicon tetrachloride being in the range from about 2 to 3.3, and preferably from about 2.5 to about 3.0. As mentioned before, water is used in accordance with the invention in amounts which may vary from about 10 to about 25 mol percent, based on the total quantity of the alkanol and water. The reaction results in the formation of a product mixture which contains the desired mixed disiloxanepolysiloxane product and the corresponding tetra-alkyl orthosilicate. To maintain the desired concentration of the orthosilicate moderator in the reaction zone, the orthosilicate is recovered from the product mixture by topping distillation and is recycled to the reaction zone. In this manner, the volume ratio of the orthosilicate to the reaction product mixture in the reaction zone is held in the range from about 1:10 to about 10:1, when producing predominantly disiloxane base stocks, and in the range from about 1:1 to about 1:20, when producing predominantly higher polysiloxane base stocks.

An illustration of this preferred operation of the process of my invention in which a tetra-alkyl orthosilicate is employed as the reaction moderator is offered in the following example.

*Example I*

This example describes a series of comparison tests effected to bring out the advantages obtained from the "moderating" function of orthosilicate in the production of predominantly hexa-alkoxydisiloxane mixtures.

In the first run of this test series (Run 1), wet alkanol, namely 2-ethyl butanol, and a silicon tetrahalide ($SiCl_4$) were added in substantially stoichiometric amounts into an initially dry flask. The temperature was approximately 100° F. Upon distillation (topping), the composition of the reaction product mixture was determined. The disiloxane-polysiloxane ratio was found to be much lower than the acceptable minimum of 1.5 specified by the industry.

In the next run of the same series (Run 2), the reaction was carried out under the same conditions, except that the wet alkanol contained about 67% of the theoretical amount of water required for the formation of disiloxane. On completion of the reaction, the ratio of disiloxane to polysiloxane was again found not to come up to the acceptable minimum of 1.5 specified by the industry.

In Run 3, the reaction was carried out again under similar conditions, but the water in the wet alkanol was present in excess of the theoretical amount required for the formation of disiloxane. The disiloxane to polysiloxane volume ratio was extremely low, and the product obviously was unsuitable for industrial uses.

In Run 4, the reaction flask initially contained 200 ml. of orthosilicate from a previous reaction batch. In this case, the reaction was again carried out at 100° F. and yielded a product mixture with the disiloxane-polysiloxane ratio equal to 1.80 which fully satisfied the specifications. The results of the described four runs are tabulated in Table I which shows the ratio of disiloxane to polysiloxane for each run and the composition of the corresponding reaction product mixtures after having been distilled.

TABLE I.—PREPARATION OF DISILOXANE MIXTURES

| Run No.[1] | Ratio of Disiloxane to Polysiloxane | Composition of Product, in Vol. Percent [2] | | | |
|---|---|---|---|---|---|
| | | Alkanol | Ortho-Silicate | Disiloxane | Polysiloxane |
| 1 | 0.77 | 8 | 39 | 23 | 30 |
| 2 | 1.33 | 10 | 62 | 16 | 12 |
| 3 | 0.42 | 14 | 12 | 22 | 52 |
| 4 [3] | 1.80 | 0 | 2 | 63 | 35 |

[1] All batches made with one-half mol of $SiCl_4$.
[2] By distillation after removal of reaction moderator where used.
[3] About 10% of the reaction mixture lost in blowing with nitrogen.

*Example II*

In this test series, carried out to illustrate the preferred operation of the process with recycle of the orthosilicate moderator, stoichiometric proportions of silicon tetrachloride as a typical silicon tetrahalide, 2-ethyl butanol as a typical alkanol, and water (14.4 mol percent, based on the total wet alkanol) were added simultaneously into a glass-lined reactor which initially contained enough tetra-2-ethylbutyl orthosilicate (about one half of the total volume of all reactants) to assure the desired distribution of the hexa-alkoxydisiloxane and higher polyalkoxypolysiloxanes. The product, upon distillation, disclosed a volume ratio of disiloxane to polysiloxane of about 3.8:1.

At the time of starting, the orthosilicate was present in a volume somewhat greater (1.3:1 volume ratio) than half of the total reaction mixture. It reacted with wet alkanol to form disiloxane, thereby desirably moderating the disiloxane to polysiloxane ratio. The main reaction followed the equation

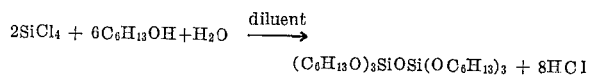

$$2SiCl_4 + 6C_6H_{13}OH + H_2O \xrightarrow{\text{diluent}} (C_6H_{13}O)_3SiOSi(OC_6H_{13})_3 + 8HCl$$

The temperature was kept at less than about 105° F., and the reaction mixture (a 30-gallon batch) was stirred vigorously at 60–100 r.p.m. When the reaction was completed, the mixture was withdrawn from the reactor and purged of dissolved hydrogen chloride by blowing with an inert gas (nitrogen). The orthosilicate which did not convert to polysiloxanes and the unreacted 2-ethyl butanol, both of which remained in the crude unseparated product mixture, were substantially completely removed from the reactor by topping distillation.

The results of this series of test runs are tabulated below in Table II.

TABLE II

| | Run No. | | | | |
|---|---|---|---|---|---|
| | 1 | 2 | 3 | 4 | 5 |
| Time of addition in hours | 4.5 | 4.7 | 5.0 | 10.8 | 10.8 |
| Water in alcohol, mol percent | 14.4 | 20 | 30 | 20 | 20 |
| Composition of reaction product mixture in vol. percent. | | | | | |
| 2-ethyl butanol | 15 | 15 | 15 | [1] 25 | [2] 37 |
| Orthosilicate | 45 | 36 | 30 | 20 | 6 |
| Disiloxane | 30 | 36 | 35 | 34 | 31 |
| Polysiloxane | 8 | 12 | 17 | 18 | 22 |
| Disiloxane/polysiloxane ratio | 3.8 | 3.0 | 2.1 | 1.8 | 1.4 |

[1] Neutralized by blowing with $N_2$.
[2] Neutralized with $NaHCO_3$.

At the conclusion of the test series corresponding to Table II, it was observed that invariably less orthosilicate was present in the final reaction mixture than at the start of the reaction. In other tests which use lesser volumes of orthosilicate at the beginning of the reaction, it was observed that the less orthosilicate was fed in, the more of it was found present in the crude reaction product.

On substituting 2-ethyl hexanol in another series of tests for 2-ethyl butanol and on repeating the above procedure under substantially identical conditions, the resulting disiloxane-polysiloxane mixture is found to have a similar disiloxane to polysiloxane ratio of 3:1, and the quantity of orthosilicate contained in the final product mixture is invariably less than the orthosilicate available in the reactor at the beginning of the reaction.

Similar observations are made with ethanol, n-hexanol and n-dodecanol as the alkanol reactant, in accordance with the invention.

It is to be understood that the foregoing description and the accompanying test data are merely illustrative of the invention and are not to be interpreted in limitation thereof except as set forth in the annexed claims.

I claim:
1. Process for preparing polyalkoxypolysiloxane mixtures which comprises reacting a mixture consisting essentially of (a) silicon tetrahalide selected from the group consisting of silicon tetrachloride, silicon tetrabromide and silicon tetraiodide, (b) alkanol selected from the group consisting of primary and secondary alkanols of from 4 to 10 carbon atoms each, (c) water, and (d) tetraalkyl orthosilicate in which the alkyl groups correspond to the alkyl radical of the above alkanol, said alkanol being present in a ratio of from about 2.0 to 3.3 mols per each mol of said tetrahalide, said water beiing present in an amount from about 10 to 25 mol percent based on the combined quantity of alkanol and water and said tetraalkyl orthosilicate being present in a ratio of from about 10:1 to about 1:10 volumes for each volume of the final reaction product mixture, said reaction being at a temperature in the range from about 70 to about 105° F. and said final reaction product mixture containing less orthosilicate than in the beginning reaction mixture.

2. The process as defined in claim 1 wherein orthosilicate produced is separated from the reaction product mixture and recycled to the reaction mixture.

3. The process as defined in claim 1 wherein the alkanol is present in a ratio of from about 2.5 to about 3.0 mols per each mol of said tetrahalide.

4. The process as defined in claim 1, wherein the silicon tetrahalide is silicon tetrachloride and the alkanol is 2-ethyl butanol.

References Cited by the Examiner

UNITED STATES PATENTS

| | | | |
|---|---|---|---|
| 2,814,635 | 11/1957 | Scheel et al. | 260—448.8 |
| 3,027,394 | 3/1962 | Pierce et al. | 260—448.8 |

TOBIAS E. LEVOW, *Primary Examiner.*

SAMUEL H. BLECH, HELEN M. McCARTHY, *Examiners.*

P. F. SHAVER, *Assistant Examiner.*